United States Patent
Smith et al.

(10) Patent No.: US 6,909,741 B1
(45) Date of Patent: Jun. 21, 2005

(54) NETWORK QUALITY OF SERVICE LOCALIZER

(75) Inventors: Patrick D. Smith, Deerfield, IL (US); Robert G. Uskali, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 165 days.

(21) Appl. No.: 09/712,812

(22) Filed: Nov. 13, 2000

Related U.S. Application Data

(63) Continuation-in-part of application No. 09/571,068, filed on May 15, 2000, now Pat. No. 6,389,068, which is a continuation-in-part of application No. 09/470,890, filed on Dec. 22, 1999.

(51) Int. Cl.[7] .................................................. H04B 1/38
(52) U.S. Cl. ....................................... 375/222; 370/242
(58) Field of Search ................................ 375/219, 222, 375/377; 714/107, 111; 370/242, 248, 229, 230, 237; 725/107, 111

(56) References Cited

U.S. PATENT DOCUMENTS

| | | | | | |
|---|---|---|---|---|---|
| 5,095,535 A | * | 3/1992 | Freeburg | ................. | 455/278.1 |
| 5,153,877 A | * | 10/1992 | Esaki et al. | ................. | 370/389 |
| 5,822,299 A | * | 10/1998 | Goodman | .................... | 370/228 |
| 5,883,819 A | * | 3/1999 | Abu-Amara et al. | ............ | 716/1 |
| 6,134,230 A | * | 10/2000 | Olofsson et al. | ............. | 370/337 |
| 6,314,085 B1 | * | 11/2001 | Saranka | ...................... | 370/230 |
| 6,363,053 B1 | * | 3/2002 | Schuster et al. | ............. | 370/230 |
| 6,442,158 B1 | * | 8/2002 | Beser | ......................... | 370/352 |
| 6,523,068 B1 | * | 2/2003 | Beser et al. | ................ | 709/238 |
| 6,588,016 B1 | * | 7/2003 | Chen et al. | ................. | 725/111 |
| 6,700,875 B1 | * | 3/2004 | Schroeder et al. | .......... | 370/252 |

* cited by examiner

*Primary Examiner*—Kevin Burd
(74) *Attorney, Agent, or Firm*—Robert P. Marley; Kevin L. Williams

(57) ABSTRACT

A method and apparatus for quality of service localization within a relatively time-invariant communications network, the method comprising the steps of: receiving quality of service estimations for a plurality of communications mediums, wherein each of the plurality of communications mediums is defined between a respective one of a plurality of transmitters located within the communications network to a common receiving point of the communications network, wherein each communications medium is conveyed over at least one shared physical communications path and at least one non-shared communications path; and comparing the quality of service estimations for the plurality of communications mediums with one another in order to localize a respective quality of service estimation to a likely physical communication path within the communications network.

34 Claims, 7 Drawing Sheets

TABLE 1 — 500

| HUB | SERVING GROUP | SUBSCRIBER POOL S[NXYZ] FIELDS | MEDIUMS M[NXYY'] FIELDS | | | | | | |
|---|---|---|---|---|---|---|---|---|---|
| 1 | 1 | S[1YZ] | M[1110] | M[1111] | M[1120] | M[1122] | M[11..0] | M[11..Y'] | M[11Y0] | M[11YY'] |
| 1 | 2 | S[12YZ] | M[1210] | M[1211] | M[1220] | M[1222] | M[12..0] | M[12..Y'] | M[12Y0] | M[12YY'] |
| 1 | ⋮ | ⋮ | ⋮ | ⋮ | ⋮ | ⋮ | ⋮ | ⋮ | ⋮ | ⋮ |
| 1 | X | S[1XYZ] | M[1X10] | M[1X11] | M[1X20] | M[1X22] | M[1X..0] | M[1X..Y'] | M[1XY0] | M[1XYY'] |
| 2 | 1 | S[21YZ] | M[2110] | M[2111] | M[2120] | M[2122] | M[21..0] | M[21..Y'] | M[21Y0] | M[21YY'] |
| 2 | 2 | S[22YZ] | M[2210] | M[2211] | M[2220] | M[2222] | M[22..0] | M[22..Y'] | M[22Y0] | M[22YY'] |
| 2 | ⋮ | ⋮ | ⋮ | ⋮ | ⋮ | ⋮ | ⋮ | ⋮ | ⋮ | ⋮ |
| 2 | X | S[2XYZ] | M[2X10] | M[2X11] | M[2X20] | M[2X22] | M[2X..0] | M[2X..Y'] | M[2XY0] | M[2XYY'] |
| 3 | 1 | S[31YZ] | M[3110] | M[3111] | M[3120] | M[3122] | M[31..0] | M[31..Y'] | M[31Y0] | M[31YY'] |
| 3 | 2 | S[32YZ] | M[3210] | M[3211] | M[3220] | M[3222] | M[32..0] | M[32..Y'] | M[32Y0] | M[32YY'] |
| 3 | ⋮ | ⋮ | ⋮ | ⋮ | ⋮ | ⋮ | ⋮ | ⋮ | ⋮ | ⋮ |
| 3 | X | S[3XYZ] | M[3X10] | M[3X11] | M[3X20] | M[3X22] | M[3X..0] | M[3X..Y'] | M[3XY0] | M[3XYY'] |
| ⋮ | ⋮ | ⋮ | ⋮ | ⋮ | ⋮ | ⋮ | ⋮ | ⋮ | ⋮ | ⋮ |
| N | 1 | S[N1YZ] | M[N110] | M[N111] | M[N120] | M[N122] | M[N1..0] | M[N1..Y'] | M[N1Y0] | M[N1YY'] |
| N | 2 | S[N2YZ] | M[N210] | M[N211] | M[N220] | M[N222] | M[N2..0] | M[N2..Y'] | M[N2Y0] | M[N2YY'] |
| N | ⋮ | ⋮ | ⋮ | ⋮ | ⋮ | ⋮ | ⋮ | ⋮ | ⋮ | ⋮ |
| N | X | S[NXYZ] | M[NX10] | M[NX11] | M[NX20] | M[NX22] | M[NX..0] | M[NX..Y'] | M[NXY0] | M[NXYY'] |

FIG.5

TABLE 2 — MEDIUMS THAT CAN BE TESTED ON A SUBSCRIBER BASIS, [X] DENOTES POTENTIAL TO GATHER INFORMATION ON NETWORK HEALTH BY A GIVEN SUBSCRIBER.

| SERVING HUB | GROUP | SUBSCRIBER | SUBSCRIBER POOL S[NXYZ] FIELDS | M[1110] | M[1111] | M[1120] | M[1122] | M[1130] | M[1133] | M[11..0] | M[11..Y'] | M[11Y0] | M[11YY'] |
|---|---|---|---|---|---|---|---|---|---|---|---|---|---|
| 1 | 1 | 1 | S[111Z] | [X] | [X] | [X] | | [X] | | : | : | : | : |
| 1 | 1 | 2 | S[112Z] | [X] | | [X] | [X] | [X] | | : | : | : | : |
| 1 | 1 | 3 | S[113Z] | [X] | | [X] | | [X] | [X] | : | : | : | : |
| 1 | 1 | : | : | | | | | | | : | : | : | : |
| 1 | 1 | Y | S[11YZ] | [X] | | | | | | : | : | [X] | [X] |

| | | | | M[1210] | M[1211] | M[1220] | M[1222] | M[1230] | M[1233] | M[12..0] | M[12..Y'] | M[12Y0] | M[12YY'] |
|---|---|---|---|---|---|---|---|---|---|---|---|---|---|
| 1 | 2 | 1 | S[121Z] | [X] | [X] | [X] | | [X] | | : | : | : | : |
| 1 | 2 | 2 | S[122Z] | [X] | | [X] | [X] | [X] | | : | : | : | : |
| 1 | 2 | 3 | S[123Z] | [X] | | [X] | | [X] | [X] | : | : | : | : |
| 1 | 2 | : | : | | | | | | | : | : | : | : |
| 1 | 2 | Y | S[12YZ] | [X] | | | | | | : | : | [X] | [X] |

| | | | | M[1X10] | M[1X11] | M[1X20] | M[1X22] | M[1X30] | M[1X33] | M[1X..0] | M[1X..Y'] | M[1XY0] | M[1XYY'] |
|---|---|---|---|---|---|---|---|---|---|---|---|---|---|
| 1 | X | 1 | S[1X1Z] | [X] | [X] | [X] | | [X] | | : | : | : | : |
| 1 | X | 2 | S[1X2Z] | [X] | | [X] | [X] | [X] | | : | : | : | : |
| 1 | X | 3 | S[1X3Z] | [X] | | [X] | | [X] | [X] | : | : | : | : |
| 1 | X | : | : | | | | | | | : | : | : | : |
| 1 | X | Y | S[1XYZ] | [X] | | | | | | : | : | [X] | [X] |

NETWORK QUALITY OF SERVICE LOCALIZER

This patent document is a Continuation in Part of U.S. patent application Ser. No. 09/571,068, filed May 15, 2000, of Smith et al., for SLICED BANDWIDTH DISTORTION PREDICTION, now U.S. Pat. No. 6,389,068, and also a Continuation in Part of U.S. patent application Ser. No. 09/470,890, filed Dec. 22, 1999, of Smith et al., for METHOD AND APPARATUS FOR AUTOMATED CORRELATION OF DIGITAL MODULATION IMPAIRMENT.

FIELD OF THE INVENTION

The present invention relates to quality of service estimation within a communication network, and more specifically to quality of service estimations of communication mediums of a relatively time-invariant communications system. Even more specifically, the present invention relates to localizing quality of service estimations to specific communication mediums or physical communication paths within a relatively time-invariant communication network.

BACKGROUND OF THE INVENTION

In a communication system, signals comprising data are typically transmitted from a transmitter to a receiver via a communication medium or communication channel contained within a communication link. The transmitter modulates and transmits these signals at a specified modulation type (e.g. QPSK, 16-QAM, and 64-QAM) and at a specified data or signaling rate (e.g. 160 k bits per second) within the communication medium. Typically, the communication medium (also referred to simply as a "medium") has a particular range of frequencies or bandwidth, such as from 5 MHZ to 42 MHZ, that the signals travel at over the communication link. Additionally, the medium also refers to the physical path which the signal travels over from a transmitter to a receiver.

As these data-bearing signals propagate over the medium of the communication link, the signals experience distortion such that the signals being received at a corresponding receiver are altered from their transmitted form depending on noise levels, non-linearities, time delays and reflections that are all frequency and medium dependent upon the signals within the medium, for, example. Specifically, the amplitude and phase of the signals are distorted, which is referred to in the composite as medium dependent channel distortion (also referred to as "channel distortion"). If the channel distortion of the signal over a particular medium provides an acceptable signal to noise ratio, for example, the receiver demodulates the signal and extracts the data from the signal. Disadvantageously, if the channel distortion is too great or the signal to noise ratio is unacceptable, the receiver will demodulate the signals and potentially misinterpret the information or data carried therein.

Knowledge of the channel distortion of a particular communication medium (i.e., medium dependent channel distortion) provides an estimation of the quality of service of the particular communication medium. The quality of service for the particular communication medium limits the signaling that can be transmitted and received over the communication medium. For example, the quality of service for a particular medium effects what levels or grades of service, i.e. the modulation level and signaling rate, for signaling that can be supported by the medium. Thus, in order to determine what levels of service are possible over a particular medium, a quality of service is determined for the particular medium based upon channel distortion estimates.

In a communication network, it would be desirable to estimate the channel distortion for communication mediums between any number of nodes within the communication network in order to estimate the quality of service for various components of the network and to provide an indication of the health of the network. A communication network includes many communication mediums between many different nodes within the communication network. For example, a network hub communicates with many communication devices, i.e., subscriber devices, within the network, such that a communication medium is defined between each of the subscriber devices and the network hub. Each of these communication mediums may have a different level of medium-dependent channel distortion specific to that particular medium and resulting in potentially different quality of service estimations for one or more of the communication mediums. Thus, each of the communication mediums within the communication network may actually support different levels or grades of service, i.e. have a different quality of service estimation.

Additionally, many of these different communication mediums may share portions of the same physical communication path (also referred to as the communication link) between the respective subscriber device and the network hub. For example, in communication networks spanning a large geographical area, e.g. a hybrid fiber/coax (HFC) system, the physical communication path from one node, e.g. a subscriber device, in the network to another node, e.g. the network hub, may include physical portions that are shared by many communication mediums. Thus, simply estimating a quality of service for a particular communication medium within the communication network does not provide any information about which physical portion of the physical communication path utilized by the communication medium is, for example, limiting the quality of service supportable by the communication medium.

Dynamically allocated communication networks, in which a subscriber device is dynamically connected to a network routing device, i.e. a public switched telephone network (PSTN) switch hub, local area network (LAN), or wide area network (WAN), only allow the ability of the network to estimate a quality of service for the particular connection between the network routing device and the subscriber device during the current physical connection. This estimation of the quality of service is based upon the ability of the subscriber device to connect itself to the terminating device, i.e., the network routing device. Since the currently allocated physical connection path is for the current communication only, a subsequent physical connection from the network routing device to the same subscriber device may involve an entirely different physical connection path depending on the allocation of network resources, the availability of network resources, etc. Thus, any quality of service estimation for the communication medium involving the currently allocated physical path will only be valid for the duration of the connection, since the allocated physical path will likely be different in subsequent allocations by the network routing device. Thus, the prediction of what the next quality of service for the medium to that same subscriber will be ambiguous due to the dynamic switching element in the network that allocates the physical connection. Therefore, such quality of service estimations would not provide an indication of the health of the network over time, which may be used to indicate weak points within the network or to indicate a degradation of service over a localized section or path of network within the composite overall network.

In a relatively time-invariant (i.e. the transmitter and the receiver are relatively fixed in location with respect to one another) communications network that is non-dynamically allocated (i.e. the physical transmission paths are known and relatively static over time), such as a hybrid fiber/coax (HFC) system, estimation of medium dependent channel distortion for any one particular communication medium within the network is expensive and requires potentially obtrusive, dedicated equipment to be physically connected to both the transmitter and the receiver of the communications medium. For example, the network provider may connect different equipment, e.g. transmitters and receivers, each capable of transmitting and receiving signaling of differing levels of quality of service in order to determine if the medium will support such signaling. Alternatively, the network provider may physically connect an adaptive bandwidth and signaling rate scan receiver in the communication path that can switch between higher and lower modulation levels and signaling rates, such as the HP89441 VSA (Vector Signal Analyzer made by Hewlett Packard), along with an appropriate transmitter that can transmit signaling with the different modulation levels and signaling rates. Alternatively, a network analyzer, which is a two-port system, may be coupled to the transmit and receive end of the communications path to analyze the medium there between. Each of these devices requires physical connection at both ends of the medium, i.e. the transmitting end and the receiving end, and requires that any existing services be interrupted during the testing process. Thus, the use of such physically connected devices, especially in networks encompassing a large geographic area, at all nodes within a given network is prohibitively time consuming, expensive and results in the interruption of services (when present) to subscribers of the network. Furthermore, such equipment does not account for the fact that the tested physical communication path is likely shared with multiple communication mediums.

The present invention advantageously addresses the above and other needs.

BRIEF DESCRIPTION OF THE DRAWINGS

The above and other aspects, features and advantages of the present invention will be more apparent from the following more particular description thereof, presented in conjunction with the following drawings wherein:

FIG. 5 is a table which illustrates the various communications mediums relating to a pool of subscribers within serving groups within hubs for the cable modem communications network 300 of FIGS. 3 and 4;

FIG. 6 is a table mapping the individual subscribers within serving groups of a single hub and also illustrating which mediums provide information on the health of the communication network of FIGS. 3 and 4 by a given subscriber when comparatively analyzed.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

The present invention advantageously addresses the needs above as well as other needs by providing a method and system for localizing the quality of service of a relatively time-invariant, non-dynamically switched communication network such that the quality of service of the network may be analyzed in a physical piece-wise fashion over time without interrupting existing services.

In one embodiment, the invention can be characterized as a method of quality of service localization within a relatively time-invariant communications network comprising the steps of: receiving quality of service estimations for a plurality of communications mediums, wherein each of the plurality of communications mediums is defined between a respective one of a plurality of transmitters located within the communications network to a common receiving point of the communications network, wherein each communications medium is conveyed over at least one shared physical communications path and at least one non-shared physical communications path; and comparing the quality of service estimations in order to localize a respective quality of service estimation to a likely physical communication path within the communications network.

In another embodiment, the invention can be characterized as a system for quality of service localization comprising a relatively time-invariant communications network that includes a common receiving point; a plurality of transmitters for transmitting signaling to the common receiving point; and a plurality of communications mediums coupling respective ones of the plurality of transmitters to the common receiving point, wherein each of the plurality of communications mediums is conveyed over at least one shared physical communications path and at least one non-shared physical communications path to the common receiving point. Also included in the system is a quality of service localizer coupled to the common receiving point, wherein the quality of service localizer localizes, based upon the analysis of quality of service estimations received from the common receiving point, a particular quality of service estimation to a likely physical communication path within the communications network.

Figure 1:
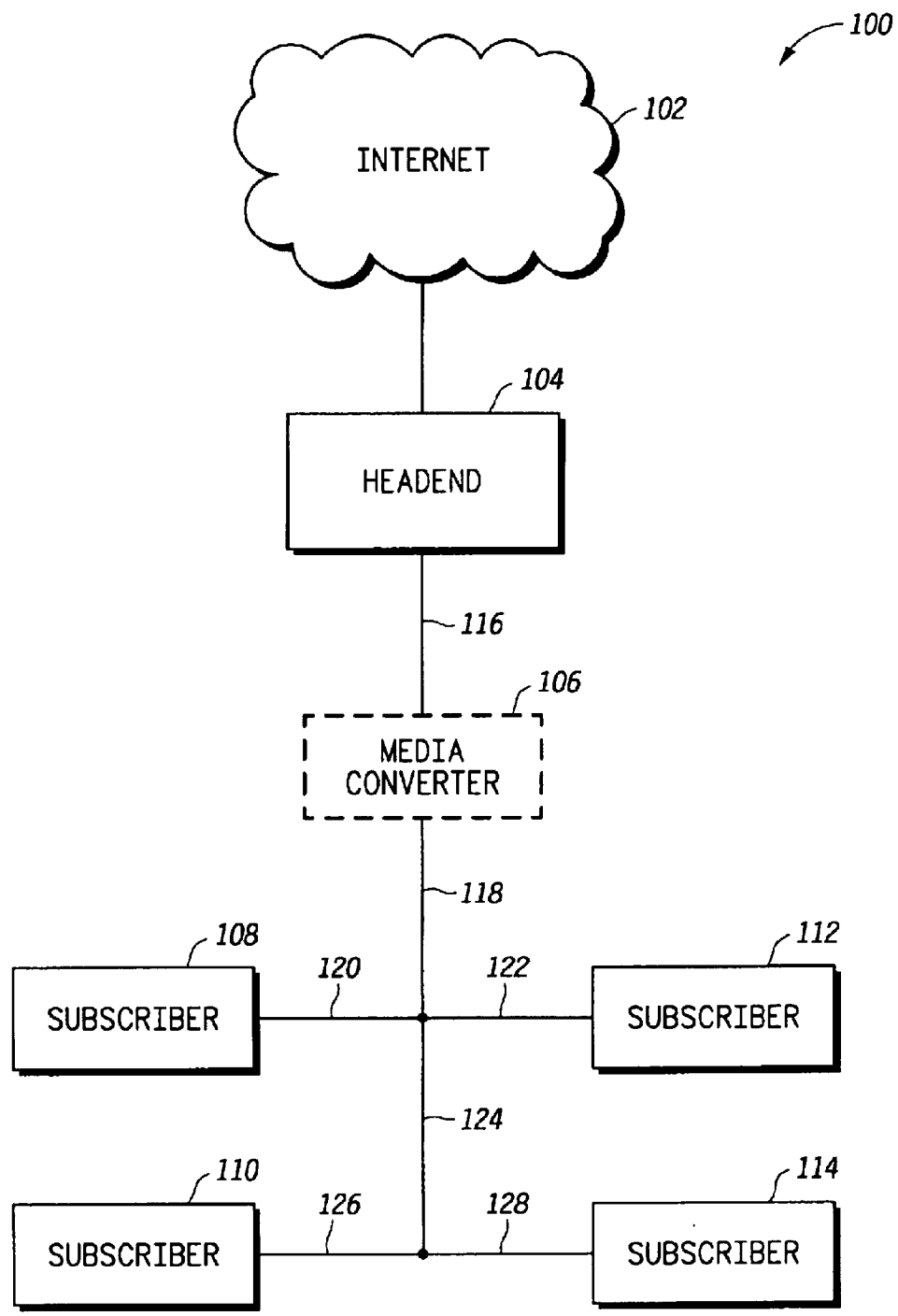
FIG. 1 is a block diagram illustrating a relatively time-invariant communication network in which a quality of service is localized to a particular subscriber or physical communication path of the communication network in accordance with one embodiment of the present invention.

Referring first to FIG. 1, a block diagram is shown illustrating a relatively time-invariant communication network in which a quality of service is localized to a particular subscriber or physical communication path of the network in accordance with one embodiment of the present invention. The network 100 comprises an internet 102, headend 104, media converter 106, and subscribers 108, 110, 112 and 114. While subscribers 108, 110, 112, and 114 are illustrated, it is understood that the network 100 may include any number of subscribers. Internet 102 may be any information network, for example, a global information network. Internet 102 is coupled to the headend 104. The headend 104 communicates with the internet 102 and with subscribers 108, 110, 112 and 114. The headend 104 is coupled to the media converter 106 via physical communication path 116 (also referred to as communication link 116). The media converter 106 is coupled to subscribers 108, 110 112 and 114 via physical communication paths 118, 120, 122, 124, 126 and 128 (also referred to as communication links 118, 120, 122, 124, 126 and 128). Communication between the headend 104 and the subscribers 108, 110, 112 and 114 is effected by the media converter 106.

In a hybrid fiber/coax (HFC) cable system, physical communication path 116 comprises a fiber optic cable that supports communications between the headend 104 and the media converter 106, and physical communication paths 118, 120, 122, 124, 126 and 128 each comprise coaxial cable that each support communications between the media converter 106 and subscribers 108, 110, 112 and 114.

The media converter 106 converts the media over which the communication occurs. For example, in a HFC system, the media converter 106 passes signals between the fiber optic cable, i.e. physical communication path 116, and the coaxial cable, i.e. physical communication path 118. However, the media converter 106 may be unnecessary if a continuous medium is used between the headend 104 and the subscribers 108, 110, 112 and 114. Any suitable medium or media may be used as the respective physical communication paths between the headend 104 and the subscribers 108, 110, 112 and 114. For example, besides fiber optic cable and coaxial cable other media such as twisted pair cable, wireless, or satellite communications links may be used.

Furthermore, in operation, a communication medium is defined between the headend 104 and subscriber 108 and includes physical communication paths 116, 118 and 120. Similarly, the communication medium defined between the headend 104 and subscriber 110 includes physical communication paths 116, 118, 124 and 126; the communication medium defined between the headend 104 and subscriber 112 includes physical communication paths 116, 118 and 122; and the communication medium defined between the headend 104 and subscriber 114 includes physical communication paths 116, 118, 124 and 128. As such, physical communication paths 120, 122, 126 and 128 represent non-shared physical communication paths while physical communication paths 116, 118 and 124 represent shared physical communication paths. For example, physical communication path 124 is "shared" by communications between subscribers 110 and 114 and the headend 104 only, while physical communication path 126 is only used for communications between subscriber 110 and the headend 104, i.e. physical communication path 126 is a "non-shared" physical communication path.

As data-bearing signals propagate over the various communication mediums using the respective physical communication paths, the respective communication mediums introduce variable amounts of "medium dependent channel distortion" (also referred to as channel distortion). Thus, signals transmitted over a respective communication mediums occupying a respective physical communication path/s are altered from their transmitted form as they propagate to respective receivers of the network. The level of channel distortion depends on noise levels, non-linearities, time delays and reflections that are all frequency and medium dependent upon the signals within the communication medium, for example. Such channel distortion contributors include amplifiers, lasers, poor signal grounds and faulty subscriber units, for example.

Knowledge of the channel distortion (i.e., medium dependent channel distortion) of a particular communication medium provides an estimation of the quality of service of the particular communication medium. The quality of service for the particular communication medium limits the signaling that can be transmitted and received over the communication medium. For example, the quality of service for a particular medium effects what levels or grades of service, i.e. the modulation level and signaling rate, for signaling that can be supported by the medium. Thus, in order to determine what levels of service are possible over a particular medium, a quality of service is determined for the particular medium based upon channel distortion estimates.

In accordance with one embodiment of the invention, a system and method are provided for localization of medium dependent channel distortions of a relatively time-invariant communication network 100. Localization refers to an ability to analyze a network at a fine granularity to determine system limitations in a physical piece-wise fashion within the communication network 100. As such, estimates of the level of channel distortion are obtained for each of the respective communication mediums that occupy one or more of the physical communication paths 116, 118, 120, 122, 124, 126 and 128. These channel distortion estimates are used to determine the estimations of quality of service supportable by the respective communication mediums.

Furthermore, by comparing these quality of service estimates with each other, a channel distortion may be localized to a specific geographic physical communication path within the network. For example, a channel distortion may be localized to a specific subscriber, a specific non-shared physical communication path, or a specific shared physical communication path within the network 100. Such determinations may be made by the network management remotely without the need to physically install testing equipment or physically inspect portions of the communication network 100. Therefore, the quality of service for a particular subscriber located at a specific geographic location can be ascertained while providing services to a subscriber pool or when initially setting up new services. This allows the network provider the opportunity to localize network degradation remotely, precisely, and automatically.

Advantageously, the network management, typically located within the headend 104 employs non-obtrusive channel distortion estimates using the techniques described in, but not limited to, U.S. patent application Ser. No. 09/571,068, filed May 15, 2000, of Smith et al., for SLICED BANDWIDTH DISTORTION PREDICTION, now U.S. Pat. No. 6,389,068, and U.S. patent application Ser. No. 09/470,890, filed Dec. 22, 1999, of Smith et al., for METHOD AND APPARATUS FOR AUTOMATED COR- RELATION OF DIGITAL MODULATION IMPAIRMENT, both of which are incorporated herein by reference. The channel distortion techniques described in these references are briefly described with reference to FIG. 2.

In one embodiment, the network management (e.g. in the headend 104) uses the channel distortion estimation methods to gather information from a pool of transmitters (e.g. subscribers 108, 110, 112 and 114), which is then used to analyze the network 100 along any piece-wise connection within the communication network 100.

This embodiment represents a departure from the known prior art in that it is possible to remotely localize the quality of service of the relatively time-invariant communication network 100 in a physical piece-wise fashion in order to remotely determine what quality of service of signaling is supportable in specific geographic portions of the communication network 100. Advantageously, this is accomplished without having to physically inspect the physical piece-wise connection or to connect test equipment up to each individual physical connection.

Figure 2:
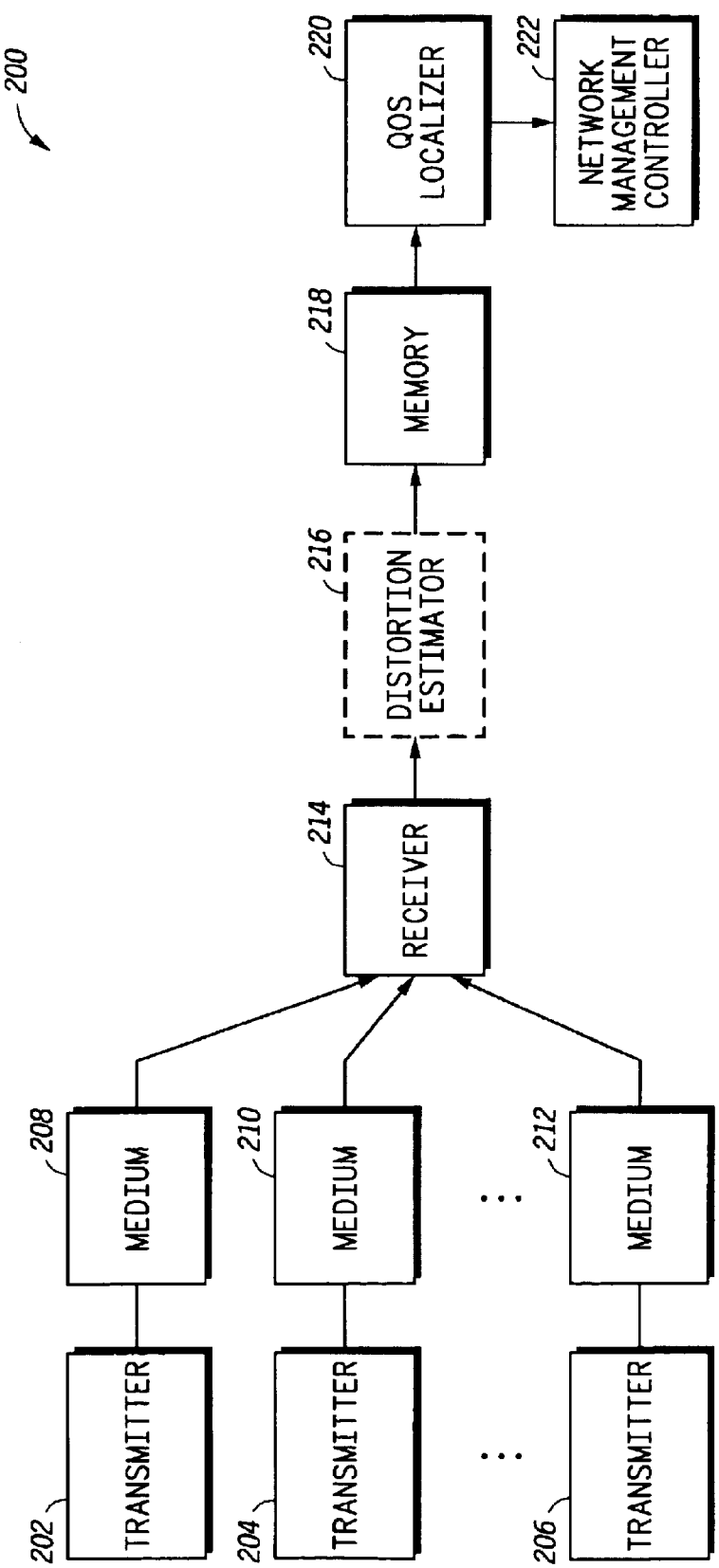
FIG. 2 is a block diagram of a system for localizing a quality of service of a relatively time-invariant communications network, such as shown in FIG. 1, including a distortion estimator for estimating a medium dependent channel distortion and corresponding quality of service estimation between differing nodes in the network and also including a quality of service localizer for localizing a particular quality of service estimation to a likely physical communication path within the network, in accordance with another embodiment of the present invention.

Referring next to FIG. 2, a block diagram is shown of a system for localizing a quality of service of a relatively time-invariant communication network, such as shown in FIG. 1, including a distortion estimator for estimating a given level of distortion between differing nodes in the network and also including a quality of service localizer for localizing a particular quality of service estimation to a likely physical communication path within the network, in accordance with another embodiment of the present invention. Shown is a communication network 200 including transmitters 202, 204 and 206, communication mediums 208, 210 and 212, receiver 214 (also referred to as a "common receiving point" 214), a distortion estimator 216, a memory 218, a quality of service localizer 220 (also referred to as a QoS localizer 220), and a network management controller 222 (also referred to as a system controller/reporting subsystem 222).

Each transmitter 202, 204 and 206 is coupled to the receiver 214 via a respective one of the communication mediums 208, 210 and 212. The receiver 214 is coupled to the distortion estimator 216, which is coupled to the memory 218. The memory 218 is coupled to the QoS localizer 220 which, in turn, is coupled to the network management controller 222.

In operation, each transmitter 202, 204 and 206 and the receiver 214 are separate points or nodes within the communication network 200. For example, transmitter 202 is located at subscriber 108 of FIG. 1 and the receiver 214 is located at the headend 104 of FIG. 1, while communication medium 208 represents the medium utilizing over physical communication paths 120, 118 and 116 of FIG. 1. The communication network 200 is a relatively time-invariant network, i.e. the physical connection linking the respective transmitters to the receiver is relatively time-invariant or relatively fixed. As such, the physical communication path linking each transmitter to the receiver 214 is known and unique, i.e. the network is not dynamically switched such that communications from one node to another occupy a different physical path every time they communicate. Furthermore, the physical communication path may comprise a variety of physical mediums, for example, the communication mediums 208, 210 and 212 may utilize fiber links, cable links, multi-point microwave links, or geo-synchronous satellite links, for example.

Signaling is transmitted from each transmitter 202, 204 and 208 to the receiver 214 via the respective communication medium 208, 210 and 212. As described above, and depending on the transfer function of the respective communication medium 208, 210 and 212, the transmitted signal will be altered from its transmitted form. This is known as medium-dependent channel distortion (also referred to simply as channel distortion). This channel distortion is caused by noise levels, non-linearities, time delays and reflections that are all frequency and medium dependent upon the signals within the medium, for example. For example, communication medium 208 may introduce a differing level of channel distortion than communication medium 210.

Often, especially in communication networks 200 covering a large geographic region, such as a hybrid fiber/coax (HFC) network, these channel distortions can widely vary. The level of channel distortion effects the quality of service of signaling that is supportable by the communication medium, i.e. what modulation and signaling rates are supported.

In addition to the physical communication path being known and unique for each transmitter within the communication network 200, the receiver 214 receives the identity of a respective transmitter 202, 204 and 206 within the communications from the respective transmitter 202, 204 and 206. This information is gathered by the receiver 214 since the receiver 214 is time synchronized with each transmitter 202, 204 and 206 at each subscriber; thus, the receiver 214 knows the originating transmitter for each signal received. Furthermore, each received signal itself will typically contain header information, e.g. in a preamble, that contains transmitter identification which identifies the originating transmitter to the receiver. For example, the IP (Internet Protocol), TID Transmission Identification), SID (System Identification) or MAC (Media Access Controller) addresses are known for each transmitter 202, 204 and 206 ands are inherent in the signaling protocol that allow the receiver to reconstruct the signal. With the knowledge of each transmitter's software identification, the geographic location within the communication network 200 can be correlated to this software identification tag.

It is noted that although one receiver 214 is illustrated, receiver 214 may be embodied as multiple receivers. However, each of the multiple receivers are located within a common geographic point or node within the communication network 200. For example, each of the multiple receivers is located within the headend 104 of FIG. 1. Thus, the receiver 214 geographically represents a "common receiving point".

Once the signaling is received at the receiver 214, a distortion estimator 216 determines an estimate of the channel distortion present in the respective communication medium 208, 210 and 212 using the received signaling from each respective transmitter 202, 204 and 206. From the channel distortion estimate, a quality of service estimation is determined. This quality of service estimation indicates what quality of service signaling, i.e. what specific modulation level and signaling rate, is supportable by the particular communication mediums 208, 210 and 212. These estimations are stored in memory 218.

The distortion estimator 216 is illustrated as optional because the quality of service estimation may be roughly estimated through trial and error or by simply determining a quality of service estimation for each communication medium 208, 210 and 212 based upon bit error rate or packet error rate of signaling received at the receiver 214. These quality of service estimations need not be analytically precise, and may be as simple as determining whether of not any service has been established for a particular node or medium (e.g. mediums 208, 210 and 212). As such, any comparative metric may be use to gather information about the quality of service across the geographic network and the collected data (e.g. the quality of service estimations) may then be used to determine network topology relative, and thus, localize network and medium performance.

Preferably, the level of channel distortion is estimated using a specific technique by the distortion estimator 216. Examples of two exemplary non-obtrusive and remote channel distortion estimation techniques employed by the distortion estimator 216 include the techniques described in U.S. patent application Ser. No. 09/571,068, filed May 15, 2000, of Smith et al., for SLICED BANDWIDTH DISTORTION PREDICTION, now U.S. Pat. No. 6,389,068 and U.S. patent application Ser. No. 09/470,890, filed Dec. 22, 1999, of Smith et al., for METHOD AND APPARATUS FOR AUTOMATED CORRELATION OF DIGITAL MODULATION IMPAIRMENT, which have been previously incorporated herein by reference. The two exemplary techniques are preferable since neither requires the obtrusive testing equipment or other dedicated equipment be connected to the communication mediums to the be tested or analyzed.

The following is a brief summary of an embodiment of the channel distortion estimation method as described in U.S. patent application Ser. No. 09/571,068, filed May 15, 2000, of Smith et al., for SLICED BANDWIDTH DISTORTION PREDICTION, now U.S. Pat. No. 6,389,068. First, a plurality of short duration test signals are transmitted over a communication medium to be analyzed from the transmitter, e.g. transmitter 202, to the receiver 214 of the communication medium 208. Each of the plurality of test signals occupies a different narrowband slice or a different position in frequency of the communication medium 208 having a given frequency bandwidth. For example, each test signal has a test bandwidth which is about 20% of the given bandwidth of the communication medium 208. These test signals may be transmitted simultaneously with an existing service by either multiplexing the test signals with the existing service or by moving the existing service to a different position in frequency within the given bandwidth. Thus, the plurality of test signals non-obtrusively are transmitted over the communication medium 208 to the receiver 214.

At the receiver 214, as is normally done, the test signals (as well as the normal signaling) are processed with an equalizer to obtain equalizer coefficients. Since the receiver 214 receives data indicating the identity of the specific transmitter 202, the receiver 214 knows which transmitter 202, 204 and 206 within a network transmitted each of the test signals (e.g. transmitter 202). A phase distortion estimator (embodied within the distortion estimator 216) then analyzes the equalizer coefficients for each of the test signals in order to determine a time when a dominant channel distortion occurs for each of the test signals. The phase distortion estimator then determines a differential group delay between the time of the dominant channel distortion for each of the received test signals from a particular transmitter 202. Advantageously, this differential group delay approximates the phase distortion of the specific communication medium 208. Similarly, the phase distortion is determined for each of the respective transmitters using communications mediums, e.g. transmitters 202. 204 and 206 using communication mediums 208, 210 and 212, respectively.

At the same time the phase distortion is determined, the amplitude distortion for the particular communication medium 208 is also determined, for example, by an amplitude distortion estimator (embodied within the distortion estimator 216). As such, the received test signals (the same test signals as described above) are processed with an autocorrelator or a fast Fourier transform (FFT) within the receiver 214, which are well known in the art, in order to determine the power of each of the received test signals from each transmitter. Each of the power estimations for each of the test signals received from respective transmitters using respective communication mediums are analyzed to determine an amplitude ripple across the entire given bandwidth of each communication medium 208, 210 and 212. This amplitude ripple approximates the amplitude distortion of the particular communication medium 208, 210 and 212.

Now, having estimated both the phase distortion and the amplitude distortion of a particular communication medium, the transfer function is known for the particular communication medium. Knowing the transfer function of a particular communication medium, conventional signal processing simulators, such as "System View by Elanix" developed by Elanix, Inc. of Westlake Village, Calif. or "SPW" developed by Cadence Design Systems, Inc. of San Jose, Calif., or mathematically based theoretical limits that can be worked out with pencil and paper are used to quantitatively determine the quality of service supportable by each communication medium 208, 210 and 212. In other words, it can be determined if the particular communications medium will support a given signaling rate and a given modulation level. This may be done by the distortion estimator 216 or alternatively, done by the network management controller 222.

The following is a brief summary of an embodiment of the channel distortion estimation method as described in U.S. patent application Ser. No. 09/470,890, filed Dec. 22, 1999, of Smith et al., for METHOD AND APPARATUS FOR AUTOMATED CORRELATION OF DIGITAL MODULATION IMPAIRMENT. Digitally modulated signaling is received at the receiver 214 from a respective transmitter 202 via a communication medium 208. The receiver 214 extracts soft decision data from the digitally modulated signal. The soft decision data is digital data represented, for example, in two's complement form with on e 8-bit I value and one 8-bit Q value representing the location on the I/Q plane of a symbol represented by the soft decision data. The soft decision data is input to an impairment correlator (embodied within the distortion estimator 216). The impairment correlator stores the locations in signal space for the soft decision data over time for each particular communication medium and applies an impairment mask to the soft decision data.

This embodiment includes a variety of stored impairment masks that each correspond to a different type of channel distortion that may be introduced by the particular communication medium 208. For example, depending on the type of channel distortion introduced by the communication medium, the location of the soft decision data (also referred to as symbols) within signal space will be different or predictably offset from its ideal location. This technique uses predetermined impairment masks that indicate where the soft decision data should be generally located within signal space given a specified channel distortion. Additionally, different Impairment masks may be applied for symbol level distortions and constellation level distortions. For example, different impairment masks are stored specific to the following types of channel distortion: a phase noise impairment mask: a continuous wave (CW) noise impairment mask: a signal reflection impairment mask; an I/Q imbalance impairment mask; a compression impairment mask; an amplitude modulation(AM)-to-phase modulation(PM) impairment mask; a composite phase noise and CW noise impairment mask; and any other composite impairment mask for correlating multiple types of impairment.

As such, different types of impairment masks are applied to the soft decision data, as described above. For each impairment mask, the impairment correlator determines a subset of the soft decision data that fall within the particular impairment mask. This is done by determining the number of occurrences of soft decision data that fall within the impairment mask. Then a correlation weight is calculated for each impairment mask. In one embodiment, this correlation weight may be calculated as the ratio of the number of occurrences of the soft decision data that fall within the impairment mask to the total number of occurrences of soft decision data. A correlation weight is determined for each impairment mask.

Then, all of the correlation weights are compared to determine a likelihood, typically in the form of a percentage, that a channel distortion of a particular communication medium is due to a particular distortion type and also an indication of the severity of the channel distortion (e.g. when compared to a desired signal to noise ratio). Thus, this process yields a likelihood of the source of a specific channel distortion and an estimated level of channel distortion.

From this information, one skilled in the art could then determine what quality of service is supportable for each particular communication medium. For example, using the above mentioned, conventional signal processing simulators, such as "System View by Elanix" developed by Elanix, Inc. of Westlake Village, Calif. or "SPW" developed by Cadence Design Systems, Inc. of San Jose, Calif., may be used to quantitatively determine what quality of service is supportable by the particular communication medium 208, 210 and 212; thus, providing a quality of service estimation for each communication medium 208, 210 and 212. This may be done by the distortion estimator 216 or alternatively, done by the network management controller 222.

It is noted that in either case, the distortion estimator 216 outputs a quality of service estimation, which indicates what quality of service for signaling is supported by a particular communication medium, e.g. communication mediums 208, 210 and 212.

Furthermore, advantageously, in either case, estimations of the quality of service supportable by each particular communication medium 208, 210 and 212 is obtained without having to connect test equipment or to physically inspect the physical path of each communication medium. Such estimations may be determined locally at the receiver 214 or remotely at a network management controller 222 coupled to the receiver 214.

Next, the quality of service estimations specific to each communication medium 208, 210 and 212 are stored in memory 218. The QoS localizer 220 uses the quality of service estimations stored in memory 218 to make quantitative determinations as to the health of the communication network 200. For example, this stored information is used to determine what physical portions or physical communication paths of the communication network 200 are able to support signaling at what specific quality of service levels. In order to accurately localize the quality of service of the communication network 200, the QoS localizer 220 must take into account the physical communication paths that are "shared" between respective communication mediums. For example, certain physical communication paths, or physical portions of the communication network, are shared by other communication mediums, while some physical communication paths are unique to only one communication medium, i.e. the physical communication path is non-shared. Thus, in this embodiment, the QoS localizer 220 knows which physical communication paths are shared and non-shared. A more complete description of the comparative process performed by the QoS localizer 220 is described with reference to FIGS. 3–6 below.

Furthermore, the quality of service estimations may be monitored over time to determine if there is a degradation of the quality of service available to certain subscribers. And advantageously, by comparatively analyzing the respective quality of service estimations for different communication mediums 208, 210 and 212, the specific physical communication path that is most likely limiting the quality of service may be identified. All of this is advantageously performed without having to connect test equipment to each transmitter and receiver in the communication network 200 (which would be prohibitively expensive and interrupt existing services) or without actually having to physically inspect the various physical communication paths to determine why a particular subscriber has a reduced quality of service capability.

The QoS localizer 220 forwards data to the network management controller 222, which stores the data for use by network providers. The information provided is used to track the quality of service for every physical piece-wise connection in the communication network 200 over time. Thus, when a degradation in the quality of service supportable in a particular communication medium is detected, the specific physical communication path may be inspected to determine and correct the source of the degraded quality of service.

It is noted that the system of FIG. 2 may be implemented to include a program storage device readable by a machine, tangibly embodying a program of instructions executable by the machine to perform the method steps performed by the distortion estimator 216, the QoS localizer 220 (e.g. the steps listed with reference to the flowchart of FIG. 7 below). and/or the network management controller 222. To allow the machine to execute the program of instructions, the machine may include a processor, such as a microprocessor (e.g. a digital signal processor) or other logic circuitry capable of executing the program of instructions. The distortion estimator 216, QoS localizer 220 and the network management controller 222 may be implemented using either hardware, software, or a combination thereof, for example using a general purpose microprocessor, a microcontroller, and/or application specific logic circuits, and software and/or firmware cooperatively related to them. Furthermore, the distortion estimator 216, QoS localizer 220, and the network management controller 222 may be embodied as separate components located apart from one another or may comprise a single integrated unit at one physical location. For example, these components may be located within the receiver 214, e.g. the receiver of the headend 104 of FIG. 1, or may be coupled to the receiver 214. However, typically, these components are all embodied in the headend of the hybrid fiber/coax system.

Figure 3:
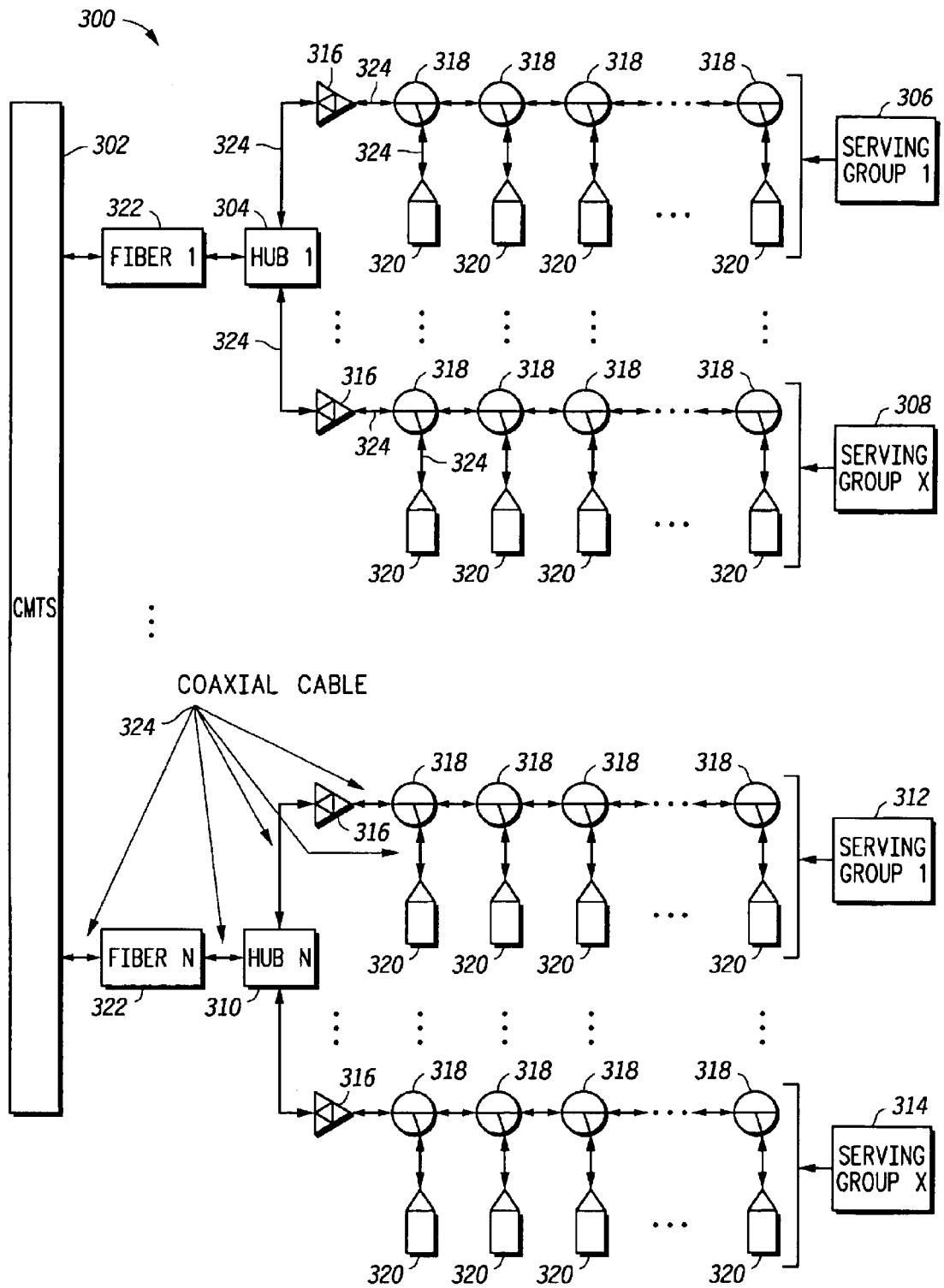
FIG. 3 is a diagram of a cable modem communication network including multiple hubs in which a quality of service is localized, by the system of FIG. 2, for example, to a particular subscriber or physical communication path within the network in accordance with yet another embodiment of the present invention.

Referring next to FIG. 3, a diagram is shown of a cable modem communication network including multiple hubs in which a quality of service is localized, by the system of FIG. 2, for example, to a particular subscriber or physical portion, e.g. physical communication path of the network in accordance with yet another embodiment of the present invention. Shown is a communication network 300 including a cable modem termination system 302 (CMTS) (also referred to as residing within the headend 104 of FIG. 1), hub 1 304 having serving groups 306 and 308, hub n 310 having serving groups 312 and 314, bidirectional amplifiers 316, subscriber network taps 318, subscriber devices 320, fiber links 322 (which represent physical communication paths), and cable links 324 (which also represent physical communication paths).

The cable modem communication network 300 is an example of a relatively time-invariant communications network having a generally known geographic/network topology. For example, in this embodiment, the CMTS 302 represents a common node of the communication network 300 (e.g. the CMTS 302 is contained within the headend of FIG. 1) and communicates with the individual subscriber devices 320 located in relatively fixed geographic positions over a given geographic region. In the multi-hub configuration illustrated, multiple hubs, e.g. hub 1 304 through hub n 310, are coupled to the CMTS 302 via respective fiber links 322. Each hub then is coupled to each of the respective subscriber devices 320 via cable links 324. The subscriber devices 320 serviced by each hub are grouped according to service groups, e.g. service groups 306 and 308 under hub 1 304. Each hub, e.g. hub 1 304, is similar to the media converter of FIG. 1. converting communications to and from fiber links 322 and cable links 324.

Within a service group, e.g. service group 306, the cable link 324 couples to a bidirectional amplifier 316 to amplify the signals in either the upstream direction (i.e. the direction from the respective subscriber devices 320 to the CMTS 302) and in the downstream direction (i.e. the direction from the CMTS 302 to each subscriber device 320). At various geographic points on the cable link 324, a respective subscriber network tap 318 Is coupled to the cable to allow respective subscriber devices 320 to be coupled to the hub. The specific connections will be discussed in more detail with reference to FIGS. 4–6.

As can be seen, the cable modem communication network 300 can support multiple hubs, each having multiple serving groups servicing multiple subscriber devices. In operation, each subscriber device 320 is typically a cable modem unit located at a subscriber's residence or place of business. The subscriber device 320 contains both a transmitter for transmitting signaling to the CMTS 302 and also contains a receiver for receiving signaling from the CMTS 302. As is known in the art, such cable modem communication networks 300 may be used by network providers to provide television, internet and telephony services, for example, to subscribers via their subscriber devices 320.

It is noted that the cable modem communication network 300 may include a variety of different architectures and still benefit from the techniques of several embodiments of the invention, as long as the communication network includes a transmitter pool that has a defined, and relatively time-invariant, physical connection. As such, the physical path for each subscriber devices 320 in the communication network 300 is known and unique for each subscriber device 320 in the service area.

Figure 4:
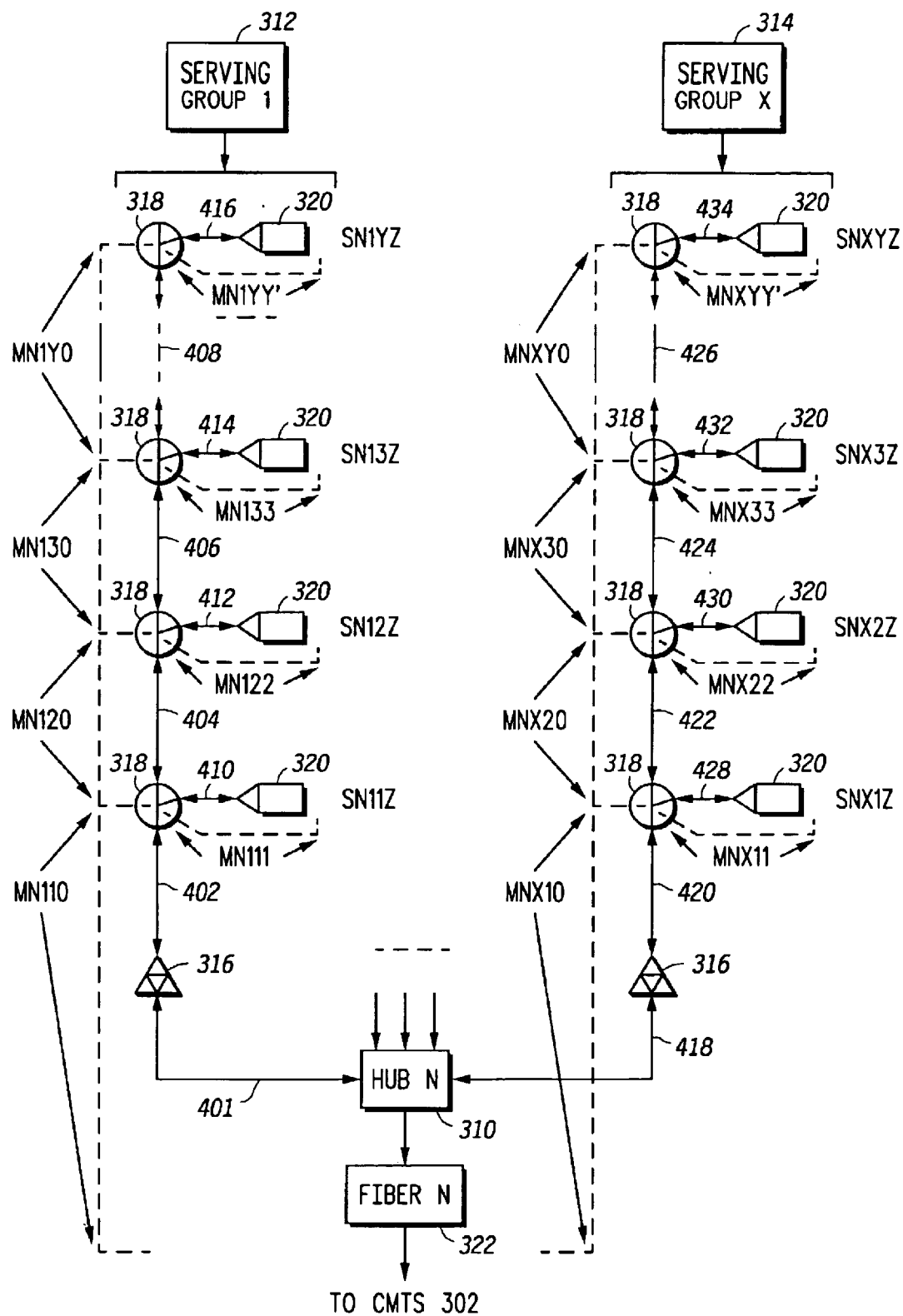
FIG. 4 is a diagram of the cable modem communication network of the FIG. 3 illustrating a single hub having multiple serving groups and also illustrating various defined mediums over shared and non-shared physical communication paths.

Referring next to FIG. 4, a diagram is shown of the cable modem communication network of the FIG. 3 illustrating a single hub having multiple serving groups. Shown is hub n 310 having a fiber link 322 (which represents a physical communication path) to the CMTS 302, serving group 1 312 through serving group X 314 coupled to the hub 310 via cable links. Also illustrated are the bidirectional amplifiers 316, subscriber network taps 318, and subscriber devices 320. Furthermore, the cable links of FIG. 4 are illustrated as "shared" physical communication paths 401, 402, 404, 406, 408, 418, 420, 422, 424 and 426 and also as "non-shared" physical communication paths 410, 412, 414, 416, 428, 430, 432 and 434.

Additionally, the respective communication mediums utilizing respective physical communication paths are labelled in the form $M_{NXYY'}$, where "M" is the communication medium. Also, the specific subscriber devices 320, i.e. transmitters of FIG. 2, are labelled in the form of $S_{NXYZ}$ where "S" is the subscriber device. In both cases, "N" is the hub identifier; "X" is the serving group within a given hub identifier; "Y" is the transmitter identifier (which can be IP, MAC, TID, SID or any other address correlated to the physical connection in the network); "Y'" is the network medium identifier; and "Z" is the transmitter's vendor identifier.

"Y'" indicates whether the particular communication medium is a "backbone" communication medium (when Y'=0), i.e. a communication medium utilizing a "shared" physical communication path, or a medium utilizing a "non-shared" physical communication path (when Y'≠0) that is only utilized by one subscriber device 320. When Y'=0, "Y" indicates how deep into the communication network 300 the Yth transmitter resides. For example, if Y=4 and Y'=0 in the $M_{NXYY'}$ field (e.g. $M_{NXYY'}$), this indicates that the communication medium is the communication networks backbone connection, medium $M_{NX40}$, and that it will be shared by all transmitters with Y>4 and that this transmitter will share $M_{NX(Y<4)0}$ network backbone connections. In other words, the transmitter (i.e. $S_{NX4Z}$) at the fourth subscriber device 320 will utilize medium $M_{NX44}$ (i.e. a non-shared physical communication path from transmitter $S_{NX4Z}$ to the subscriber network tap 318 connection to the backbone), medium $M_{NX40}$ (i.e. a shared physical communication path which is also shared with the $5^{th}$, $6^{th}$, ... nth transmitters), $M_{NX30}$ (i.e. a shared physical communication path 406 for the $3^{rd}$, $4^{th}$, $5^{th}$, $6^{th}$, ... nth transmitters), $M_{NX20}$ (i.e. a shared physical communication path 404 for the $2^{nd}$, $3^{rd}$, $4^{th}$, $5^{th}$, $6^{th}$, ... nth transmitters), and $M_{NX10}$ (i.e. shared physical communication paths 401, 401 and 322 for the $1^{st}$, $2^{nd}$, $3^{rd}$, $4^{th}$, $5^{th}$, $6^{th}$, ... nth transmitters).

Relating these mediums $M_{NXYY'}$ to the communication mediums 208, 210 and 212 of FIG. 2, if transmitter 202 is transmitter $S_{NX3Z}$, then communication medium 208 includes $M_{NX33}$, $M_{NX30}$, $M_{NX20}$ and $M_{NX10}$, and the receiver 214 is typically located at the CMTS 302. Note also that medium $M_{NX33}$ utilizes non-shared physical communication path 432; medium $M_{NX30}$ utilizes shared physical communication path 424; medium $M_{NX20}$ utilizes shared physical communication path 422; and medium $M_{NX10}$ utilizes shared physical communication paths 420, 418 and 322. Thus, it is important to recognize that each communication medium of FIG. 2 (i.e. communication mediums 208, 210 and 212) is defined as a composite medium from a respective transmitter (e.g. $S_{NXYZ}$) to a common receiving point (e.g. CMTS 302), and includes at least one shared medium (e.g. $M_{NXYY'}$ where Y'=0) and one non-shared medium (e.g. $M_{NXYY'}$ where Y'≠0). Furthermore, each shared medium (e.g. $M_{NXYY'}$ where Y'=0) includes one or more shared physical communication paths (e.g. 322, 418, 420, 422, etc.) and each non-shared medium (e.g. $M_{NXYY'}$ where Y'≠0) includes one or more non-shared physical communication paths (e.g. 428 or 430).

Briefly referring to FIG. 5, a table 500 is shown which illustrates the various communications mediums relating to a pool of subscribers within serving groups within hubs for the cable modem communications network 300 of FIGS. 3 and 4. This table 500 uses the above notation for the fields of the transmitters $S_{NXYZ}$ and the mediums $M_{NXYY}$.

Referring back to FIG. 4, the subscript "Z" (i.e. the transmitter's vendor identifier) is used to denote the vendor who manufactured or supplied the specific transmitter. For example, Z=0 corresponds to transmitters made by vendor A; Z=1 corresponds to transmitters made by vendor B, etc. As such, when analyzing the network, differences in quality of service may be localized to a specific transmitter/subscriber device 320 made by a respective vendor; thus, indicating that the particular vendor may be producing sub-standard equipment.

Having labeled the topology of the communication network 300 and using one or more of the techniques described with reference to FIG. 2 to determine a quality of service estimation for a given communication medium between a particular transmitter (e.g. $S_{NXYZ}$) and a common receiving point (e.g. CMTS 302), the network provider is able to localize medium dependent channel distortions to a likely physical communication path within the network 300. This is accomplished by comparatively analyzing the quality of service estimations for each communication medium (e.g. communication mediums 208, 210 and 212). Constructing a network topology such as illustrated in FIGS. 3 and 4, enables the network provider to understand the specific mediums ($M_{NXYY}$) making up each communication medium (e.g. communication medium 208, 210 and 212) from the transmitter (e.g. $S_{NXYZ}$) to the receiver (e.g. CMTS 302), keeping in mind that there are shared mediums and non-shared mediums utilizing shared physical communication paths (e.g. 322, 418, 420, etc.) and non-shared physical communication paths (e.g. 428, 430, etc.). Thus, a particular quality of service limitation may be localized to a particular physical communication path without having to physically inspect or test each physical communication path in the communication network. Similarly, the network can be analyzed for certain physical communication paths that for one reason or another are able to support signaling with a higher quality of service than others (e.g. there is less channel distortion in a particular physical communication path due to microreflections from the subscriber network tap the particular subscriber device 320. The following illustrate several examples of the possible analysis that could be performed using the techniques of one or more embodiments of the invention.

EXAMPLE 1

Given three transmitters $S_{N11Z}$, $S_{N12Z}$ and $S_{N13Z}$ (of FIG. 4) having shared mediums $M_{N130}$ (utilizing shared physical communication path 406), $M_{N120}$ (utilizing shared physical communication path 404) and $M_{N110}$ (utilizing shared physical communication paths 402, 401 and 322) and having non-shared mediums $M_{N111}$ (utilizing non-shared physical communication path 410), $M_{N122}$ (utilizing non-shared physical communication path 412) and $M_{N133}$ (utilizing non-shared physical communication path 414). Using one of the channel distortion estimation and quality of service estimation methods described with reference to FIG. 2 at the is distortion estimator 216, a quality of service estimation is obtained for the composite communication mediums between from each transmitter (i.e. $S_{N11Z}$, $S_{N12Z}$ and $S_{N13Z}$) to the common receiving point (i.e. CMTS 302). Thus, a quality of service estimation is obtained for a communication medium from $S_{N11Z}$ to the CMTS 302 (covering $M_{N111}$ and $M_{N110}$), a communication medium from $S_{N12Z}$ to the CMTS 302 (covering $M_{N122}$, $M_{N120}$ and $M_{N110}$), and a communication medium from the $S_{N13Z}$ to the CMTS 302 (covering $M_{N133}$, $M_{N130}$, $M_{N120}$ and $M_{N110}$).

In the case that the QoS estimation for $S_{N11Z}$ is fine (i.e. remains at or near a desired level over time), while the quality of service estimations for $S_{N12Z}$ and $S_{N13Z}$ have degraded (i.e. have dropped below a desired level over time), it can be concluded that it is likely that the shared medium $M_{N120}$ is at fault, as it is the only shared medium between the degraded service. Note that this indicates that there is likely a problem with medium $M_{N120}$ utilizing shared physical communication path 404, not that there is a problem with medium $M_{N120}$. This is expressed as a likelihood since it is also possible that both the transmitters $S_{N12Z}$ and $S_{N13Z}$ are faulty. Although at this point, it is not determined with certainty which physical component of the network is at fault, the likelihood of erroneous analysis decreases as the number of transmitters and depth of the network increases. Yet another possibility is that the both $M_{N122}$ and $M_{N133}$ are at fault and another transmitter further into the network would be allowed to qualify medium $M_{N120}$ as being fine, i.e. able to support the desired grade of service. Regardless, the network provider can localize the degradation point closer to the real source of the problem, i.e. most likely $M_{N120}$ utilizing shared physical communication path 404. Thus, advantageously, by comparatively analyzing the quality of service estimations for each transmitter, a limitation to the quality of service within a network can be localized to a given piece-wise physical connection within the network without physically inspecting or locally testing each physical connection in the network.

It is noted that instead of representing these quality of service estimations in terms of "fine" or "degraded", they can be compared relative to respective numerical or quantitative measurements, such that degradations may be ranked according to severity.

EXAMPLE 2

In the event that the quality of service estimations for all three transmitters $S_{N11Z}$, $S_{N12Z}$ and $S_{N13Z}$ were degraded individually, we can conclude that medium $M_{N110}$ utilizing shared physical communication paths 402, 401 and 322 is the likely source of error, since it is the only medium shared by all three transmitters $SN_{11Z}$, $S_{N12Z}$ and $S_{N13Z}$. Again, the likely source of error is localized to a given physical portion of the communication network without local testing or physical inspection of the entire network.

EXAMPLE 3

In the event that the quality of service estimations for transmitters $S_{N11Z}$ and $S_{N13Z}$ are of acceptable quality while the quality of service estimation for transmitter $S_{N12Z}$ is degraded, it can be concluded that medium $M_{N122}$ is likely at fault and that the health of the network's backbone is not at risk. Thus, the network provider would then send personnel to find and correct the fault with $M_{N122}$. This fault could be in the non-shared physical communication path 412 utilized by the medium $M_{N122}$ or the physical network backbone connection (e.g. at subscriber network tap 318) or that the particular transmitter $S_{N12Z}$ is faulty. Furthermore, depending on the value of "Z", the vendor of the transmitter may be identified and compared to the quality of service estimations obtained for other transmitters from the same vendor. Thus, it may be determined whether or not it is likely that the transmitter is at fault depending on the vendor identifier. For example, a poor quality vendor has been allowed into the network, such that the quality of service for signaling produced from transmitters made by Vendor A decreases after a shorter operating life than comparable transmitters made by other vendors.

Although only three specific examples are described, there are many other scenarios within the communication network 300 in which a quality of service may be localized to particular physical communication path at a geographic location within the communication network 300. The possible paths may be extended on a hub basis to determine if a degradation is due to hub degradation or the performance of the CMTS or the headend itself is at fault. For example, with reference to FIG. 3, the quality of service estimations for transmitters under hub 1 304 may be compared with the quality of service estimations for other hubs, e.g. hub n 310, in order to estimate whether there is a problem with a specific hub of the communication network 300.

Additionally, quality of service estimations can be similarly compared to determine if a degradation in the quality of service is due to an entire serving group that serves a respective hub. For example, quality of service estimations for communication mediums within a serving group are compared to quality of service estimations for communication mediums of other serving groups under the same hub to determine if there is a problem with an entire serving group under a single hub. Briefly referring to FIG. 6, a table 600 is shown mapping the individual subscribers within serving groups of a single hub (i.e. hub 1 304) and also illustrating which mediums (e.g. mediums $M_{NXYY}$) provide information on the network health by a given subscriber when comparatively analyzed, as described above. As shown an [x] indicates which mediums provide information about the network health of a particular subscriber within the communication network. For example, mediums $M_{1110}$ and $M_{1111}$ provide information about the network health by transmitter $S_{111Z}$, while mediums $M_{1110}$, $M_{1120}$, $M_{1130}$, and $M_{1133}$ provide information about the network health by transmitter $S_{113Z}$ within the communication network 300.

Thus, advantageously, the network provider is able to localize a source of network degradation to its likely source. e.g. a physical communication path, within the network without the need to send qualified personnel into the field. Instead of sending a technician into the field to check each of the high level nodes and then possibly have to search the next highest density node point, etc., for the root cause of potentially one subscriber's degradation. Further advantageously, the network provider is able to detect degradation in the quality of service of a given piece-wise connection within relatively time-invariant communication network having unique and known physical connections and correct them before they become catastrophic to the customer/subscriber. Furthermore, the network provider is also able to determine the worst performing network connections, with which to make the necessary judgment calls on the best solution that fits a financial budget.

Figure 7:
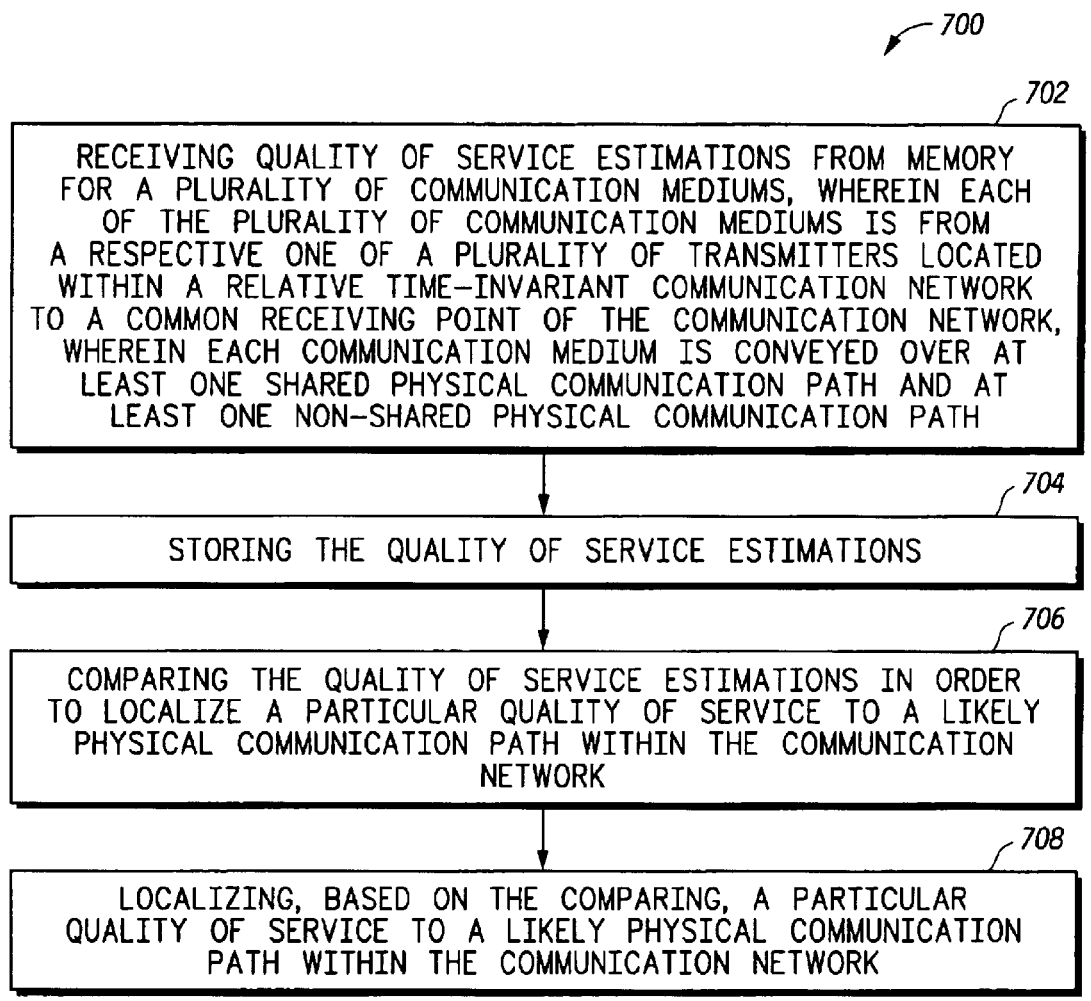
FIG. 7 is a flowchart of the method of localizing a quality of service to a particular subscriber or physical communication path of a relatively time-invariant communications network, for example, the networks of FIGS. 1 through 4, in accordance with an embodiment of the present invention.

Referring next to FIG. 7, a flowchart is shown of a method of localizing a quality of service to a particular subscriber or portion of a relatively time-invariant communications network, for example, the networks of FIGS. 1 through 4, in accordance with an embodiment of the present invention.

Preliminary steps include estimating the channel distortion of a plurality of communication mediums of a relatively time-invariant communication network, such as described with reference to FIGS. 1–4. These communications mediums (e.g. communications mediums 208, 210 and 212 of FIG. 2 including the various mediums $M_{NXYY}$ of FIGS. 3 and 4) are defined between respective transmitters (e.g. transmitters 202, 204 and 206 of FIG. 2 or transmitters $S_{NXYZ}$ of FIGS. 3 and 4) of a transmitter pool and a common receiving point (e.g. receiver 214 of FIG. 2 or CMTS 302 of FIGS. 3 and 4). The specific channel distortion estimations are performed according to any of the techniques described with reference to FIG. 2, for example, by the distortion estimator 216 of FIG. 2. These channel distortion estimations (i.e. medium dependent channel distortion estimations) are used to determine a quality of service estimation for signaling supported by each of the respective communication mediums, e.g. signaling having what modulation level and signaling rate is supported by the particular medium using conventional techniques.

In accordance with one embodiment of the invention, these quality of service estimations are obtained or received from memory or directly, e.g. from the distortion estimator, for each of the plurality of communication mediums (Step 702). Each of the plurality of communication mediums are defined between a respective transmitter of a pool of transmitters and the common receiving point of the relatively time-invariant communication network. Each of the communication mediums is conveyed over at least one shared physical communication path and at least one non-shared physical communication path. In one embodiment, the QoS localizer 220 (e.g. located in the CMTS 302 of the headend 104) receives the quality of service estimations for each transmitter in the network from a distortion estimator 216 (e.g. located in the CMTS 302 of the headend 104) of FIG. 2.

These quality of service estimations are stored within a memory (Step 704), e.g. memory 218 of FIG. 2, which may be located within or coupled to the common receiving point, e.g. located in the CMTS 302 of the communication network 300 of FIGS. 3 and 4. The storing step may be performed before and after the receiving step (i.e. Step 702).

Next, the quality of service estimations are comparatively analyzed in order to localize a given quality of service to a specific physical communication path, either shared or non-shared (Step 706). Next, based on the comparing step. a particular quality of service estimation is localized to a likely physical communication path associated with the particular quality of service estimation (Step 708). These comparing and localizing steps are performed, in one embodiment, to geographically localize a particular physical communication path likely causing a degradation in service or likely associated with a particular quality of service within the communication network. For example, several examples are described above illustrating the comparing and localizing steps.

While the invention herein disclosed has been described by means of specific embodiments and applications thereof, numerous modifications and variations could be made thereto by those skilled in the art without departing from the scope of the invention set forth in the claims.

What is claimed is:

1. A method of quality service localization within a relatively time-invariant communications network comprising:

receiving a plurality of quality of service estimations for a plurality of communications mediums, wherein each of the plurality of communications mediums is defined between a respective one of a plurality of transmitters located within the communications network to a common receiving point of the communications network, wherein each communications medium is conveyed over at least one shared physical communications path and at least one non-shared communications path, wherein each of the plurality of transmitters has only one unique physical time invariant communication path to the common receiving point; and comparing the plurality of quality of service estimations for the plurality of communications mediums with one another in order to localize a respective quality of service estimation to a likely physical communication path within the communications network.

2. The method of claim 1 further comprising localizing, based upon the comparing, the respective quality of service estimation to the likely physical communication path associated with the respective quality of service estimation.

3. The method of claim 2 wherein the localizing comprises localizing the respective quality of service estimation to the likely physical communication path without physically inspecting the likely physical path.

4. The method of claim 1 wherein the respective quality of service estimation represents a degradation in a desired quality of service for the communication network.

5. The method of claim 1 wherein each of plurality of communications mediums utilizes a known and unique physical path.

6. The method of claim 1 wherein the communication network comprises a cable modem communication network.

7. The method of claim 1 further comprising determining that the likely physical communication path comprises a shared physical communication path.

8. The method of claim 1 further comprising determining that the likely physical communication path is a non-shared physical communication path.

9. The method of claim 1 further comprising continuing existing services provided in the communication network during the receiving and comparing steps such that the existing services are not interrupted.

10. The method of claim 1 wherein the receiving comprises receiving the quality of service estimations from a memory.

11. The method of claim 1 further comprising monitoring the respective quality of service estimation over time in order to detect changes in the respective quality of service estimation of the likely physical communication path.

12. A system for quality service localization within a relatively time-invariant communications network comprising:
means for receiving a plurality of quality of service estimations for a plurality of communications mediums, wherein each of the plurality of communications mediums is defined between a respective one of a plurality of transmitters located within the communications network to a common receiving point of the communications network, wherein each communications medium is conveyed over at least one shared physical communications path and at least one non-shared communications path, wherein each of the plurality of transmitters has only one unique physical time invariant communication path to the common receiving point; and
means for comparing the plurality of quality of service estimations for the plurality of communications mediums with one another in order to localize a respective quality of service estimation to a likely physical communication path within the communications network.

13. The method of claim 12 further comprising means for localizing, based upon the comparing, the respective quality of service estimation to the likely physical communication path associated with the respective quality of service estimation.

14. The method of claim 13 wherein the means localizing comprises localizing the respective quality of service estimation to the likely physical communication path without physically inspecting the likely physical path.

15. The method of claim 12 wherein the respective quality of service estimation represents a degradation in a desired quality of service for the communication network.

16. The method of claim 12 further comprising means for determining that the likely physical communication path comprises a shared physical communication path.

17. The method of claim 12 further comprising means for determining that the likely physical communication path is a non-shared physical communication path.

18. The method of claim 12 further comprising means for monitoring the respective quality of service estimation over time in order to detect changes in the respective quality of service estimation of the likely physical communication path.

19. A system for quality service localization comprising:
a relatively time-invariant communications network comprising:
a common receiving point;
a plurality of transmitters for transmitting to the common receiving point;
a plurality of communications mediums coupling respective ones of the plurality of transmitters to the common receiving point, wherein each of the communications mediums is conveyed over at least one shared physical communications path and at least one non-shared communications path to the common receiving point, wherein each of the plurality of transmitters has only one unique physical time invariant communication path to the common receiving point; and
a quality of service localizer coupled to the common receiving point, wherein the quality of service localizer localizes, based upon the comparing, with one another, a plurality of quality of service estimations received from the common receiving point, a particular quality of service estimation to a likely physical communication path within the network.

20. The system of claim 19 further comprising a distortion estimator coupled to the receiver and the quality of service localizer, wherein the distortion estimator determines the quality of service estimation for each of the plurality of communications mediums.

21. The system of claim 19 further comprising a memory coupled to the quality of service localizer.

22. The system of claim 19 further comprising a network controller coupled to the quality of service localizer.

23. The system of claim 19 wherein the common receiving point comprises a plurality of receivers.

24. The system of claim 19 wherein the common receiving point comprises a single receiver.

25. The system of claim 19 wherein the common receiving point comprises a cable modem termination system of a cable modem communication network.

26. The system of claim 19 wherein the cable modem termination system includes the quality of service localizer.

27. The system of claim 19 wherein the at least one shared physical communication path comprises a fiber link or a cable link.

28. The system of claim 19 wherein one or more of the plurality of transmitters are coupled to the common receiving point via a hub.

29. The system of claim 19 wherein a respective one or more of the plurality of transmitters are coupled to the common receiving point via a respective one of a plurality of hubs.

30. The method of claim 1 wherein at least two quality of service estimations are received corresponding to at least two respective transmitters, the two respective transmitters having at least one shared physical communications path with one another.

31. The method of claim 30, wherein said comparing step compares the at least two quality of service estimations and localizes a respective quality of service estimation to a likely physical communication path.

32. The method of claim 1, wherein the quality of service estimation is localized to a non-shared physical communication path.

33. The method of claim 1, wherein the quality of service estimation is localized to a shared physical communication path.

34. The method of claim 1, wherein the quality of service estimation is localized to a subscriber.

* * * * *